Figure 1:
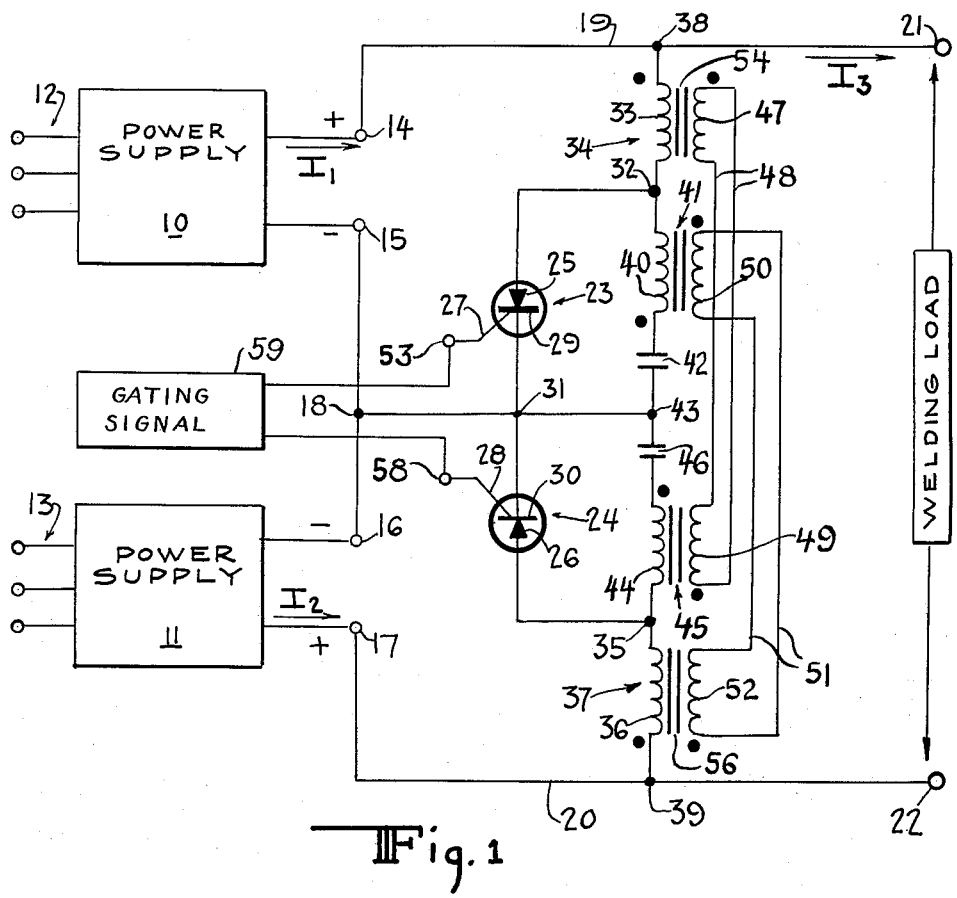

INVENTOR
DONALD KREZEK

United States Patent Office 3,089,965
Patented May 14, 1963

3,089,965
SHUNT CONTROL CIRCUIT FOR CONTROLLING WAVEFORM
Donald Krezek, Watertown, Wis., assignor to Basic Products Corporation, Milwaukee, Wis., a corporation of Wisconsin
Filed Mar. 31, 1960, Ser. No. 18,953
11 Claims. (Cl. 307—88.5)

This invention relates to a circuit for providing a predetermined waveform and more particularly to a circuit for providing asymmetrical waveform for welding apparatus and the like.

In direct current arc welding, both straight polarity (work positive, electrode negative) and reversed polarity (work negative, electrode positive) are used, depending upon the character of the work. Polarity here relates to the difference in the rates of heat development at the anode and cathode of the direct current arc. Since the positive work experiences a higher temperature than the negative one, straight polarity enables a narrower and deeper weld to be obtained. In reversed polarity welding, a wider and shallower bead may be produced. A cycle of reversed polarity welding preceding a straight polarity cycle has the advantage in that it may blow off the oxide from the work and prepare the work for the narrow deep weld of straight polarity.

It is therefore desirable to employ a direct current welding apparatus which is capable of cyclically providing both straight polarity and reversed polarity welding. In welding with both polarities, the type of work, the type of metal and other related factors require that the time cycle of application of either polarity be varied in order to obtain optimum resplts. Thus, a waveform of the welding current versus time may be one having unequal periods of time duration. The result of this is that the current waveform of the welder may be asymmetrical with respect to both the amplitude and the period of the waveform. The use of alternating current welding equipment to obtain the advantages of employing both polarities has the limitation that the period of the waveform may be varied only in a limited manner due to the fixed frequency of the alternating current of the power supply. Consequently, any change in the time duration of the particular polarity cannot extend beyond the time duration of one-half cycle of the power supply. The use of alternating current to provide welding with both polarities also would normally be limited to a time symmetrical current characteristic since this is the normal characteristic of conventional alternating current power.

One of the objects of the invention is to provide a circuit for producing a predetermined current waveform which may be asymmetrical with respect to both the amplitude and the time duration of one polarity with respect to the other.

Another of the objects of the invention is to provide a circuit for producing a predetermined current waveform by selectively shunting a portion of a plurality of direct current current sources connected across a load.

A still further object of the invention is to provide a circuit for producing a predetermined current waveform in which a pair of direct current current sources serially connected across the output is selectively shunted by switching means.

Another of the objects of this invention is to provide a circuit for adjusting the period of a predetermined current wave form.

In one aspect, the present invention is applicable as a control circuit for direct current welding apparatus employing both straight and reversed polarity and having a predetermined waveform for the welding current. Such a circuit may include a pair of direct current current sources serially connected to one another in an opposing manner and connected across the output of the circuit. Switch means are connected in shunt with each of the pair of direct current current sources. Means are provided for selectively closing either of the switch means and opening the other switch means for predetermined periods of time with the result that only the current of the unshunted direct current current source flows through the output of the circuit. In this way, an output current waveform is provided which has the polarity and amplitude of the unshunted power source and which has a time duration determined by the means for controlling the switch means.

In another aspect of the invention, controlled rectifiers are used to selectively shunt the plurality of power sources connected across the output of the circuit and means are provided to gate at least one of the controlled rectifiers into conduction and at the same time to terminate conduction of another of the rectifiers so as to obtain a waveform having a predetermined pattern.

These and other objects, features and advantages of the invention will become apparent from the following detailed description and drawings which are merely exemplary.

Figure 2:
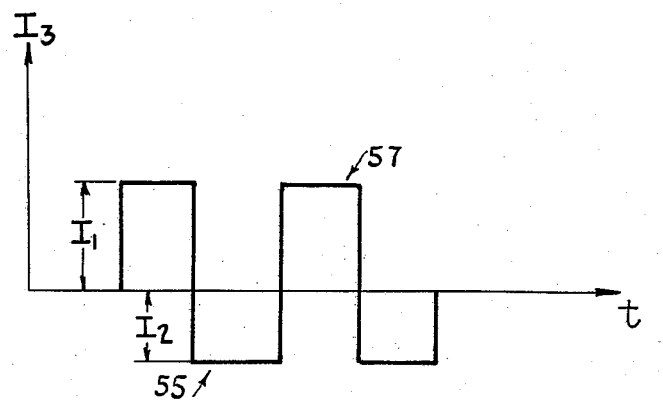

In the drawings:
FIG. 1 is a schematic showing of one form of the control circuit; and
FIG. 2 is a graphical representation of the waveform of the circuit output.

In FIG. 1 current power supplies 10 and 11 are shown connected to lines 12 and 13, respectively, which lead to a source of single phase or polyphase alternating current (not shown). Current power supplies 10 and 11 are provided with rectifier means to convert the A.C. power to D.C. power at terminals 14, 15 and 16, 17. The positive terminals of the separate D.C. power sources are terminals 14 and 17 while terminals 15 and 16 are negative. Symbols $I_1$ and $I_2$ represent the D.C. current from current power supplies 10 and 11, respectively. Currents $I_1$ and $I_2$ are joined in series in opposition by means of connection 18. Lines 19 and 20 connected to terminals 14 and 17, respectively, lead to output terminals 21, 22. The output current is designated as $I_3$. Controlled rectifiers 23 and 24, comprising anodes 25 and 26, gates 27 and 28, and cathodes 29 and 30 are provided with commonly joined cathodes at connection 31. The load is indicated as being a welding load.

Controlled rectifiers 23 and 24 may be of a type similar to an ordinary rectifier which has been modified to block in the forward direction until a small current signal is applied to the gate lead. Upon application of the gate signal, the controlled rectifier conducts in a forward direction with a forward characteristic similar to that of an ordinary rectifier. The controlled rectifier upon being gated will continue conducting even after the removal of the gate signal. The controlled rectifier will then continue to conduct as long as the current passing therethrough remains greater than a minimum value called the "holding current." If the current through the controlled rectifier drops below the value of the holding current, the controlled rectifier will cease to conduct and revert to the forward blocking condition. The controlled rectifier has characteristics similar to those of a gaseous filled tube or "Thyratron," with the exception that its forward drop may be about one-tenth that of the gaseous filled tube. A form of a controlled rectifier is a silicon controlled rectifier comprising an anode, a PNP silicon wafer consisting of N type silicon with two P layers diffused into its surfaces, a cathode connection to the P layer of the silicon wafer opposite the anode, and a gate lead attached to the same layer to which the cathode is attached. In typical use, the silicon controlled rectifier is operated well below the forward breakdown voltage and it is gated by injecting current into the gate lead. Once the gate has triggered the controlled rectifier into conduction, the gate has no further control over the rectifier and a method of terminating conduction is to reduce the current through the rectifier below the value of the holding current. The controlled rectifier is a current-triggered device as opposed to a gaseous filled tube which is a voltage-triggered device. Consequently, a low impedance voltage source or a current source must be used to trigger the controlled rectifier.

Anode 25 of rectifier 23 is joined at connection 32 to primary winding 33 of transformer 34, while anode 26 of rectifier 24 is joined at connection 35 to primary winding 36 of transformer 37. Primary windings 33 and 36 are joined at connections 38 and 39 to lines 19 and 20, respectively, with the result that the serially connected primary windings and controlled rectifiers are connected across the serially connected power supplies, having currents of $I_1$ and $I_2$. Secondary winding 40 of transformer 41 is joined to connection 32 and capacitor 42, which is in turn coupled to connections 43 and 31 so as to place secondary winding 40 and capacitor 42 in shunt relationship with controlled rectifier 23. Similarly, secondary winding 44 of transformer 45 is connected to connection 35 and capacitor 46 which leads to connection 43, thereby placing secondary winding 44 and capacitor 46 in shunt relationship with controlled rectifier 24.

Secondary winding 47 of transformer 34 is connected by lines 48 to primary winding 49 of transformer 45. Similarly, primary winding 50 of transformer 41 is connected by lines 51 to secondary winding 52 of transformer 37. The dot symbols in FIG. 1 adjacent to transformers 34, 41, 45 and 37 indicate the orientation or sense of the various windings with respect to one another per the standard convention.

In operation, if neither controlled rectifier 23 nor controlled rectifier 24 is conducting, the output current through output terminals 21, 22 would be equal to the value of current $I_1$ minus current $I_2$. The application of a positive gate or triggering signal to gate terminal 53 connected to gate 27 of controlled rectifier 23, triggers the rectifier into conduction. Current $I_1$ then flows from terminal 14, through primary winding 33, and through controlled rectifier 23, returning through connection 18 to terminal 15. The inrush current $I_1$ through winding 33 induces a voltage in secondary winding 47 which is connected to primary winding 49 of transformer 45. By virtue of the reverse sense of winding 44 with respect to winding 49 as indicated by the dot symbols of transformer 45, a current of the opposite polarity, namely a negative one, is applied to anode 26 of controlled rectifier 24 with the result that the conduction is cut off. Due to the substantially short circuit condition across power supply 10 and the cutting off of conduction through controlled rectifier 24 in shunt with power supply 11, the output current $I_3$ becomes equal to current $I_2$ of power supply 11. For such a case, terminal 22 would be positive since it is connected to positive terminal 17 of power supply 11.

Core 54 of transformer 34 is provided with an air gap to prevent current $I_1$ from saturating the core and also to prevent a lag in the current change whenever the current through primary winding 33 is changed abruptly. Capacitor 46, which together with secondary winding 44 shunts controlled rectifier 24, serves to block the flow of direct current from the power supplies. In addition, capacitor 46 is selected to be of sufficiently large value to prevent any appreciable lag in the current buildup through rectifier 24 whenever current flow through capacitor 46 is suddenly changed. With controlled rectifier 23 conducting, the waveform across output terminals 21 and 22 is represented by portion 55 of the waveform shown in FIG. 2, which represents a plot of output current $I_3$ versus time.

In accordance with a predetermined pattern, a positive signal is subsequently applied to gate terminal 58 connected to gate 28 of controlled rectifier 24. The application of a positive gate signal to controlled rectifier 24 triggers it into conduction so that current $I_2$ flows from terminal 17 through primary winding 36, through controlled rectifier 24 and back to terminal 16 of power supply 11. The inrush of current $I_2$ through primary winding 36 induces a voltage across secondary winding 52 which is coupled to primary windings 50 by means of leads 51. Due to the reverse sense of the windings of transformer 41 as indicated by the dot symbols, a reverse current is induced in secondary winding 40 so that a negative current is applied to anode 25 of controlled rectifier 23, cutting off its conduction.

Transformer 37 may be provided with core 56 having an air gap so that it will not be saturated by current $I_2$ passing through primary winding 36 upon triggering controlled rectifier 24. In addition, the prevention of saturation also serves to prevent a lag in the current change when the current through primary winding 36 is changed rapidly. Capacitor 42 serves to block direct current flow from the power supplies and is of a sufficiently large value to prevent appreciable lag in the current buildup through rectifier 23 when the current through capacitor 42 is changed abruptly. With controlled rectifier 24 conducting and controlled rectifier 23 cut off, the output current $I_3$ through terminals 21, 22 will correspond to that of power supply 10, namely current $I_1$. Portion 57 of the curve in FIG. 2 is the change in the waveform which occurs upon the triggering of the controlled rectifier.

Power supplies 10 and 11 may be selected to provide unequal currents $I_1$ and $I_2$, respectively. This will result in the output waveform, as shown in FIG. 2, having unequal amplitude for each polarity. In addition, the means for providing gate pulses of positive polarity to gate terminals 53 and 58 may be adapted to gate the controlled rectifiers after unequal periods of time duration. The result then would be that the time durations within portions 55 and 57 of the curve in FIG. 2 will themselves become unequal (not shown).

For the case where the output current $I_3$ is utilized to control a welding device or to directly operate the electric arc, it is evident that the circuit provides a predetermined waveform as required by the welding conditions. For example, the wave may be predetermined so that during the period in which the work is connected to the positive terminal of the power supply, the corresponding pulse may have a maximum amplitude and time duration to raise the work to a maximum temperature. The succeeding pulse in which the work is connected to the negative side of the power supply may be of lower amplitude and shorter time duration, during which period the weld may be cleaned of oxide. The triggering signal applied to gates 27 and 28 may be such as to provide adjustable period such as by varying the signal period.

It is to be understood that the described embodiment is merely intended for purposes of illustration and that the principles of the invention are not to be limited thereto, except as defined in the appended claims.

What is claimed is:

1. In a circuit for producing a predetermined waveform, the combination including a pair of direct current sources connected to one another in series opposition, said serially connected pair of direct current sources being connected across the output of said circuit, controlled rectifier means connected in shunt with each of said pair of direct current sources, and means for selectively gating into conduction either of said controlled rectifiers and for terminating conduction of the other controlled rectifier in a predetermined pattern, the conducting controlled rectifier shunting its related direct current power source, whereby the resultant current throught the output of said circuit is a function of the current of the unshunted direct current source.

2. In a circuit for producing a predetermined waveform, the combination including a pair of direct current sources serially connected across the output of said circuit, the negative terminals of said source being connected to one another, a controlled rectifier connected in shunt with each of said pair of serially connected direct current sources, the cathodes of said controlled rectifiers and said negative terminals being commonly connected, and means for selectively gating into conduction either of said controlled rectifiers and for terminating conduction of the other controlled rectifier in a predetermined pattern of time, the conducting controlled rectifier shunting its related direct current source, whereby the resultant current through the output of said circuit is a function of the current of the unshunted direct current source.

3. In a circuit for producing a predetermined waveform, the combination including a pair of direct current sources serially connected across the output of said circuit, the negative terminals of said source being connected to one another, a controlled rectifier connected in shunt with each of said pair of serially connected direct current sources, the cathodes of said controlled rectifiers and said negative terminals being commonly connected, means for selectively gating into conduction either of said controlled rectifiers in a predetermined pattern, the conducting controlled rectifier shunting its related direct current source, and means responsive to the current flow through the conducting controlled rectifier for terminating the conduction of the other controlled rectifier, whereby the resultant current through the output of said circuit is a function of the current of the unshunted direct current source.

4. In a circuit for producing a predetermined waveform, the combination including a pair of direct current sources serially connected across the output of said circuit, the negative terminals of said source being connected to one another, a pair of controlled rectifiers, the cathodes of said controlled rectifiers being commonly connected with said negative terminals, impedance means connecting the anode of each of said controlled rectifiers to a different positive terminal of said source, additional impedance means in shunt with each of said controlled rectifiers, said impedance means connected to the anode of each controlled rectifier being connected to said additional impedance means of the other controlled rectifier, means for blocking direct current flow from said direct current sources through said additional impedance means, and means for selectively gating into conduction either of said controlled rectifiers in a predetermined pattern of time, the conducting controlled rectifier and said impedance means connected to the anode thereof shunting said direct current source connected therewith, the response of said impedance means to said shunting being conditioned by said additional impedance means connected thereto, terminating conducting of the ungated controlled rectifier, whereby the resultant current through the output of said circuit is a function of the current of the unshunted current source.

5. In a circuit for producing a predetermined waveform, the combination including a pair of direct current sources serially connected across the output of said circuit, the negative terminals of said sources being connected to one another, a pair of controlled rectifiers, the cathodes of said controlled rectifiers being commonly connected with said negative terminals, reactor means connecting the anode of each of said controlled rectifiers to a different positive terminal of said source, impedance means connected in shunt with each of said controlled rectifiers and additionally connected to said reactor means, means for blocking direct current from said direct current sources through said impedance means, and means for selectively gating into conduction either of said controlled rectifiers in a predetermined pattern, the conducting controlled rectifier and said impedance means connected to the anode thereof shunting said direct current source connected therewith, the response of said reactor means to said shunting being applied by said connected impedance means to the controlled rectifier in shunt therewith to terminate the conductions thereof, whereby the resultant current through said circuit is a function of the current of the unshunted current source.

6. In a circuit for producing a predetermined waveform, the combination including a pair of direct current sources serially connected across the output of said circuit, the negative terminals of said sources being connected to one another, a pair of controlled rectifiers, the cathodes of said controlled rectifiers being commonly connected with said negative terminals, transformer means connecting the anode of each of said controlled rectifiers to a different positive terminal of said source, additional transformer means connected in shunt with each of said controlled rectifiers and additionally connected to said transformer means, means for blocking direct current from said direct current sources through said additional transformer means, and means for selectively gating into conduction either of said controlled rectifiers in a predetermined pattern, the conducting controlled rectifier and said additional transformer means connected to the anode thereof shunting said direct current source connected therewith, the response of said transformer means to said shunting being applied by said connected additional transformer means to the ungated controlled rectifier in shunt therewith to terminate the conduction thereof, whereby the resultant current through said circuit is a function of the current of the unshunted current source.

7. In a circuit for producing a predetermined waveform, the combination inclding a pair of direct current sources serially connected across the output of said circuit, the negative terminals of said sources being connected to one another, a pair of controlled rectifiers, the cathode of said controlled rectifiers being commonly connected with said negative terminals, transformer means connecting the anode of each of said controlled rectifiers to a different positive terminal of said source, additional transformer means connected to each of said controlled rectifiers, capacitor means for blocking direct current from said direct current sources connected to said additional transformer means, each of said additional transformer means and said connected capacitor means being connected in shunt with said controlled rectifiers, said additional transformer being additionally connected to said transformer means, and means for selectively gating into conduction either of said controlled rectifiers in a predetermined pattern, the conducting controlled rectifier and said transformer means connected to the anode thereof shunting said direct current source connected therewith, the response of said transformer means to said shunting being applied by said connected additional transformer means to the controlled rectifier in shunt therewith to terminate the conductions thereof, whereby the resultant current through said circuit is a function of the current of the unshunted current source.

8. In a circuit for producing a predetermined waveform, the combination including a pair of direct current sources serially connected across the output of said circuit, the negative terminals of said sources being connected to one another, first and second controlled rectifiers, the cathodes of said controlled rectifiers being commonly connected with said negative terminals, first and second transformer means having primary and secondary windings, each of said primary windings being connected to the anode of a different one of said controlled rectifiers, a pair of additional transformer means having primary and secondary windings, each of said secondary windings being connected to a different one of said controlled rectifiers, capacitor means for blocking direct current from said direct current sources being connected to said secondary windings of said additional transformer means, each of said capacitor means and said secondary windings attached thereto being connected in shunt with a different one of said controlled rectifiers, the secondary winding of said first transformer means being connected to the primary winding of said additional transformer in circuit with said second controlled rectifier and the secondary winding of said second transformer means being connected to the primary winding of said additional transformer in circuit with said first controlled rectifier, and means for selectively gating into conduction either of said controlled rectifiers in a predetermined pattern, the conducting controlled rectifier and said primary winding connected to the anode thereof shunting said direct current source connected therewith, the response of said primary winding connected to said anode being applied to said secondary winding to the ungated controlled rectifier in shunt therewith to terminate the conductions thereof, whereby the resultant current through said circuit is a function of the current of the unshunted current source.

9. In a circuit for producing a predetermined waveform, the combination including a pair of direct current sources serially connected across the output of said circuit, the negative terminals of said sources being connected to one another, first and second controlled rectifiers, the cathodes of said controlled rectifiers being commonly connected with said negative terminals, first and second transformer means having primary and secondary windings, each said transformer means having cores containing air gaps, each of said primary windings being connected to the anode of a different one of said controlled rectifiers, a pair of additional transformer means having primary and secondary windings, each of said secondary windings being connected to a different one of said controlled rectifiers, capacitor means for blocking direct current from said direct current sources being connected to said secondary windings of said additional transformer means, each of said capacitor means and said secondary windings attached thereto being connected in shunt with a different one of said controlled rectifiers, the secondary winding of said first transformer means being connected to the primary winding of said additional transformer in circuit with said second controlled rectifier and the secondary winding of said second transformer means being connected to the primary winding of said additional transformer in circuit with said first controlled rectifier, and means for selectively gating into conduction either of said controlled rectifiers in a predetermined pattern, the conducting controlled rectifier and said primary winding connected to the anode thereof shunting said direct current source connected therewith, the response of said primary winding connected to said anode being applied to said secondary winding to the ungated controlled rectifier in shunt therewith to terminate the conductions thereof, whereby the resultant current through said circuit is a function of the current of the unshunted current source.

10. In a circuit for producing a predetermined waveform, the combination including a plurality of current sources serially connected to one other, said plurality of serially connected current sources being connected across the output of said circuit, a shunt circuit including switch means connected across each current source means for selectively closing one of said switch means for shunting its current source for a predetermined period of time, means for closing the other of said switch means at a predetermined time, and means for opening the closed switch means upon closing of the other switch means, so that current source with the open switch means only furnishes current to said output, whereby the resultant current through the output of said circuit is a function of the resultant current of the unshunted portion of said plurality of current sources.

11. In a circuit for producing a predetermined waveform, the combination including a pair of direct current sources connected to one another in series opposition, said serially connected pair of direct sources being connected across the output of said circuit, a shunt circuit including switch means connected in shunt with each of said pair of direct current sources, means for selectively closing one of said switch means for shunting its current source for a predetermined time, means for closing the other of said switch means at a predetermined time, and means for opening the closed switch means upon closing of the other switch means, so that the current source with the open switch means thereacross only furnishes current to said output, whereby the resultant current through the output of said circuit is a function of the current of the unshunted direct current source.

References Cited in the file of this patent

UNITED STATES PATENTS

| | | |
|---|---|---|
| 2,677,053 | Nims | Apr. 27, 1954 |
| 2,849,614 | Royer | Aug. 26, 1958 |
| 2,888,622 | Mooers | May 26, 1959 |
| 2,895,058 | Pankove | July 14, 1959 |
| 2,987,666 | Manteuffel | June 6, 1961 |

OTHER REFERENCES

"Electron-Tube Circuits," by Seely, McGraw-Hill, N.Y., 1950.

"Note on the Application of the Silicon Controlled Rectifier," by General Electric, December 1958.